US007000247B2

(12) United States Patent
Banzhof

(10) Patent No.: US 7,000,247 B2
(45) Date of Patent: Feb. 14, 2006

(54) AUTOMATED COMPUTER VULNERABILITY RESOLUTION SYSTEM

(75) Inventor: Carl E. Banzhof, Dallas, TX (US)

(73) Assignee: Citadel Security Software, Inc., Dallas, TX (US)

( * ) Notice: Subject to any disclaimer, the term of this patent is extended or adjusted under 35 U.S.C. 154(b) by 119 days.

(21) Appl. No.: 10/335,490

(22) Filed: Dec. 31, 2002

(65) Prior Publication Data

Related U.S. Application Data

(60) Provisional application No. 60/345,689, filed on Dec. 31, 2001.

(51) Int. Cl.
*G06F 7/04* (2006.01)

(52) U.S. Cl. .................................. 726/2; 726/3; 726/4

(58) Field of Classification Search ........ 713/200–202, 713/176, 181, 150, 153, 154; 709/223–226, 709/229, 200, 217, 219; 726/1–4, 6, 11, 726/22–27
See application file for complete search history.

(56) References Cited

U.S. PATENT DOCUMENTS

| 4,954,941 | A | 9/1990 | Redman ..................... 364/200 |
| 4,999,806 | A | 3/1991 | Chernow et al. ........... 364/900 |
| 5,581,764 | A | 12/1996 | Fitzgerald et al. .......... 395/703 |
| 5,649,187 | A | 7/1997 | Hornbuckle ................. 395/610 |
| 5,699,275 | A | 12/1997 | Beasley et al. ......... 364/514 R |
| 5,742,829 | A | 4/1998 | Davis et al. ................. 395/712 |
| 5,764,913 | A | 6/1998 | Jancke et al. .......... 395/200.54 |
| 5,771,347 | A | 6/1998 | Grantz et al. ............... 395/186 |
| 5,799,002 | A | 8/1998 | Krishnan .................... 370/234 |
| 5,805,897 | A | 9/1998 | Glowny ...................... 395/712 |
| 5,809,329 | A | 9/1998 | Lichtman et al. .......... 395/828 |
| 5,852,812 | A | 12/1998 | Reeder ........................ 705/39 |
| 5,854,794 | A | 12/1998 | Pawlowski .................. 370/509 |
| 5,860,012 | A | 1/1999 | Luu ............................ 395/712 |
| 5,919,247 | A | 7/1999 | Van Hoff et al. ........... 709/217 |
| 5,931,946 | A * | 8/1999 | Terada et al. ............... 713/201 |
| 5,933,646 | A | 8/1999 | Hendrickson et al. ...... 395/712 |
| 5,933,826 | A | 8/1999 | Ferguson ....................... 707/9 |
| 5,974,454 | A | 10/1999 | Apfel et al. ................. 709/221 |
| 5,991,802 | A | 11/1999 | Allard et al. ............... 709/219 |
| 6,016,499 | A | 1/2000 | Ferguson .................... 707/104 |
| 6,029,247 | A | 2/2000 | Ferguson .................... 713/201 |

(Continued)

OTHER PUBLICATIONS

CERT® Advisories, "CERT/CC Advisories 1988-2000," http://web.archive.org/web/20000815055129/http://www.cert.org/advisories/, 2000, 34 pages.

(Continued)

*Primary Examiner*—Hosuk Song
(74) *Attorney, Agent, or Firm*—Conley Rose, P.C.; Michael W. Piper

(57) ABSTRACT

A system and process for addressing computer security vulnerabilities. The system and process generally comprise aggregating vulnerability information on a plurality of computer vulnerabilities; constructing a remediation database of said plurality of computer vulnerabilities; constructing a remediation signature to address the computer vulnerabilities; and deploying said remediation signature to a client computer. The remediation signature essentially comprises a sequence of actions to address a corresponding vulnerability. A managed automated approach to the process is contemplated in which the system is capable of selective deployment of remediation signatures; selective resolution of vulnerabilities; scheduled deployment of remediation signatures; and scheduled scanning of client computers for vulnerabilities.

44 Claims, 6 Drawing Sheets

U.S. PATENT DOCUMENTS

| | | | | |
|---|---|---|---|---|
| 6,052,710 | A | 4/2000 | Saliba et al. | 709/203 |
| 6,061,740 | A | 5/2000 | Ferguson et al. | 709/246 |
| 6,073,214 | A | 6/2000 | Fawcett | 711/133 |
| 6,078,945 | A | 6/2000 | Hinsley | 709/105 |
| 6,094,679 | A | 7/2000 | Teng et al. | 709/220 |
| 6,108,649 | A | 8/2000 | Young et al. | 707/4 |
| 6,138,157 | A | 10/2000 | Welter et al. | 709/224 |
| 6,151,643 | A | 11/2000 | Cheng et al. | 710/36 |
| 6,151,708 | A | 11/2000 | Pedrizetti et al. | 717/11 |
| 6,157,618 | A | 12/2000 | Boss et al. | 370/252 |
| 6,202,207 | B1 | 3/2001 | Donohue | 717/11 |
| 6,219,675 | B1 | 4/2001 | Pal et al. | 707/201 |
| 6,243,766 | B1 | 6/2001 | Sliger et al. | 710/2 |
| 6,256,668 | B1 | 7/2001 | Slivka et al. | 709/220 |
| 6,263,362 | B1 | 7/2001 | Donoho et al. | 709/207 |
| 6,269,456 | B1 | 7/2001 | Hodges et al. | 714/38 |
| 6,272,677 | B1 | 8/2001 | Lam et al. | 717/11 |
| 6,279,113 | B1 * | 8/2001 | Vaidya | 713/201 |
| 6,279,156 | B1 | 8/2001 | Amberg et al. | 717/11 |
| 6,281,790 | B1 | 8/2001 | Kimmel et al. | 340/506 |
| 6,282,175 | B1 | 8/2001 | Steele et al. | 370/254 |
| 6,282,709 | B1 | 8/2001 | Reha et al. | 717/11 |
| 6,282,712 | B1 | 8/2001 | Davis et al. | 717/11 |
| 6,298,445 | B1 | 10/2001 | Shostack et al. | 713/201 |
| 6,307,841 | B1 | 10/2001 | Rowles et al. | 370/252 |
| 6,324,656 | B1 * | 11/2001 | Gleichauf et al. | 714/37 |
| 6,721,713 | B1 | 4/2004 | Guheen et al. | 705/1 |
| 6,766,458 | B1 | 7/2004 | Harris et al. | 713/201 |
| 6,859,793 | B1 | 2/2005 | Lambiase | 705/59 |
| 6,862,581 | B1 | 3/2005 | Lambiase | 705/51 |
| 2002/0026591 | A1 | 2/2002 | Hartley et al. | 713/201 |
| 2002/0087882 | A1 | 7/2002 | Schneier et al. | 713/201 |
| 2002/0100036 | A1 | 7/2002 | Moshir et al. | 717/173 |
| 2003/0135749 | A1 | 7/2003 | Gales et al. | 713/200 |
| 2004/0003266 | A1 | 1/2004 | Moshir et al. | 713/191 |

OTHER PUBLICATIONS

St. Bernard, St. Bernard Software Simplifies NT Service Pack Management with SPQuery, Apr. 20, 2000 BUSINESS WIRE.
Stephen Swoyer, Hotfix Management Tools Maturing, Nov. 19, 2001, ENT News.
"Systems Management Server Product Overview, Features", from www.Microsoft.com; Jan. 29, 2002, Feb. 8, 1999.
Sturdevant, C., "ZENWorks Cuts Legwork in NetWare Shops"; Mar. 13, 2000.
"Novell ZENworks Grows Up", Feb. 7, 2000.
www.thestandard.com article; Dec. 21, 2000.
Systems Management Server | Executive Overview, date unknown.
Fonseca, B., "Web performance tools get upgrade"; Aug. 29, 2000.
Topaz white paper; copyright date 2000.
Topaz news release; Oct. 4, 1999.
Proctor; no later than Jan. 8, 2001.
"Active Watch: Hosted Web Performance Monitoring Service"; copyright date 2000.
www.freshtech.com web pages, pp. 1-8; copyright date 1996-2000.
Freshwater Software news release; Jan. 18, 1998.
NetworkDeltaWeb[SM] page; copyright date 2000.
www.mspassociation.org web pages, pp. 1-6; no later than Nov. 28, 2001.
www.microsoft.com/smsmgmt pages, pp. 1-27; Jun. 23, 1999.
"Benefits of Software Leasing"; Dec. 15, 1998.
"Leasing Software"; no later than Feb. 27, 2001.
"ASPs: Leasing software"; copyright date 2000-2001.
Timbale pp. 1-2; Dec. 21, 2000.
"The Open Software Description Format (OSD)"; Aug. 11, 1997.
Computer Associates ManageIT news release; May 8, 2000.
www.sitepatrol.com pp. 1-2; no later than Nov. 28, 2001.
www.rhesolution.com pp. 1-4; no later than Jan. 8, 2001.
www.hostedhelpdesk.com pp. 1-4; no later than Jan. 8, 2001.
InfraDesk™ page; Dec. 21, 2000.
www.triactive.com page; no later than Nov. 28, 2001.
Webopedia.com definitions; copyright date 2001.
Technical Comparison of Systems Management Server 2.0 and Novell's ZENworks 2.0; copyright date 2000.
SafePatch Description, pp. 1-3; Oct. 2000.
SafePatch; Oct. 2000.
Marimba Castanet; copyright 2000.
www.shavlik.com pp. 1-12; copyright date 2001.
HFNetChk, pp. 1-21; copyright date 2001.
Welcome to Windows Update page; copyright date 2001.
winfingerprint pp. 1-3; no later than Sep. 10, 2001.
Shipley, G., "Tools From the Underground"; May 29, 2000.
sourceforge.net pp. 1-2; copyright date 1999, 2000, 2001.
Kearns, D., "Patch tracking"; Jun. 27, 2001.
PatchLink Press Release; Jun. 18, 2001.
PatchLink Menu: Gravitix Overview; copyright date 2001.
PatchLink Press Release; Mar. 27, 2000.
Robinson, C., "PatchLink.com Brings Remote Management Online"; Dec. 4, 2000.
Coopee, "Building a strong foundation"; Network World Fusion, Jan. 31, 2000.
"Q. What is Qchain.exe?", from www.ntfaq.com; Jul. 23, 2001.
"Newly Released PatchLink Update 4.0 . . . ", from biz.yahoo.com; Oct. 14, 2002.
Bumback, "Patching up bad patches", from www.zdnet.com; Nov. 22, 2002.
Mueller, "PatchLink Helps Keep Windows Closed", from www.networkcomputing.com; Sep. 2, 2002.
PatchLink® Update™ 4.0 White Paper: Cross-platform Security Patch Management; copyright date 2002.
Pages numbered as 1-27, from www.bigfix.com; no later than Nov. 25, 2002.
"UpdateEXPERT: Product Reviews & Testimonials" from www.stbernard.com web site; varioUS-dates are listed.
"SPQuery v4.1"; from www.networkcomputing.co.uk web site via link in "UpdateEXPERT: Product Reviews & Testimonials"; Nov. 2000.
"Ahead of the Service Pack"; from www.networkcomputing.co.uk website via link in "UpdateEXPERT: Product Reviews & Testimonials"; Nov. 2000.

* cited by examiner

Aggregation and Construction Process

Remediation Management Process

Remediation Management Process

AUTOMATED COMPUTER VULNERABILITY RESOLUTION SYSTEM

CROSS-REFERENCE TO RELATED APPLICATIONS

This application claims priority from U.S. Provisional Application Ser. No. 60/345,689 filed on Dec. 31, 2001.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The invention relates generally to a method and system for resolving security vulnerabilities in computers and, more particularly, to a vulnerability resolution system in which computer security vulnerability information from one or more sources can be aggregated and comprehensive remediation updates can be generated for managed automated distribution to target client computers.

BACKGROUND OF THE INVENTION

Computers, computer systems, and the applications running thereon are becoming increasingly complex. In addition, with the advent of the Internet and other modern networking technology, computers have become increasingly interconnected and remote accessibility of individual computers and computer networks has become more and more common. In part as a result of this complexity, the number of computer security vulnerabilities that need to be addressed continues to increase. For example, in the year 2000 alone, 650 operating system vulnerabilities were identified, including 126 in the Windows 2000/NT platform and another 46 in the Windows 9x platform. The Computer Security Institute reported 417 vulnerabilities for the year 1999, 1090 vulnerabilities for the year 2000, 2,437 in 2001, and a projected 4000+vulnerabilities in 2002. Given these trends, it has become increasingly difficult to protect computers from security breaches via these vulnerabilities. Moreover, the task of maintaining security for these computer systems and/or networks has become increasingly burdensome and difficult.

Currently, organizations typically use vulnerability scanning software or managed security providers to test computers for security weaknesses. These tools generally provide detailed information on the vulnerabilities found in the computing environment, but provide limited means for correcting or resolving the detected vulnerabilities. In order for an organization to remove identified vulnerabilities, it typically must expend a large amount of labor and resources to identify and/or create a remediation for each vulnerability then even more labor to install the vulnerability remediation on the affected computers. Often, this involves visiting each individual computer and manually applying the necessary remediation. In addition, once the remediation is applied, a user can easily remove it, or install additional software that invalidates the remediation, thereby wasting all of the effort expended in performing the remediation.

SUMMARY OF THE INVENTION

In accordance with the present invention, a method and system are presented which provide for a more automated and managed way to remediate security vulnerabilities on individual computers and computer networks. More particularly, a vulnerability resolution system is provided in which vulnerability information is aggregated, then used to construct, and subsequently update, vulnerability remediation signatures for download. The downloaded signatures may then be selectively used to address or resolve vulnerabilities on client machines having security vulnerabilities.

In one embodiment, a method for resolving vulnerabilities in a computer comprises aggregating vulnerability information on a plurality of computer vulnerabilities; constructing a remediation database of said plurality of computer vulnerabilities; constructing a remediation signature to address a computer vulnerability; and deploying said remediation signature to a client computer. The aggregating of vulnerability information comprises obtaining vulnerability information from at least one security intelligence agent, such as a database of information regarding known computer vulnerabilities or a scanning service which scans a client computer for vulnerabilities and records the vulnerability information. The remediation signature typically comprises a sequence of actions to address a corresponding vulnerability. The remediation signatures are generally associated with a corresponding computer vulnerability. A remediation profile may be constructed for a client computer to address vulnerabilities on that computer, where the profile comprises selected remediation signatures for the client computer corresponding to vulnerabilities on the client computer. The remediation signatures may be uploaded to a flash server for remote access or download by client computers or client servers. A managed remediation approach is also contemplated which would include wherein selective deployment of remediation signatures, selective resolution of vulnerabilities, scheduled scanning of client computers for vulnerabilities, scheduled deployment of remediation signatures, etc.

In another embodiment, a system for resolving computer vulnerabilities comprises a remediation server capable of coupling to a security intelligence agent having information about computer vulnerabilities in order to aggregate said vulnerability information into a remediation database. Various devices may be coupled to the remediation server to complete the system. For example, a signature module may be coupled to the remediation server to construct a remediation signature for each vulnerability. A flash server may be coupled to the signature module to provide remote access to said remediation signatures. A client server may also be included capable of coupling to said flash server to access said remediation signatures. A deployment module may be coupled to the client server capable of deploying said remediation signatures to a client computer coupled to said client server. The deployment module may also be capable of constructing a remediation profile for a client computer to address vulnerabilities on that computer, wherein the remediation profile typically comprises selected remediation signatures for the client computer corresponding to vulnerabilities on the client computer. An input module may also be coupled to the remediation server to handle the interfacing of the remediation server to a security intelligence agent having information about computer vulnerabilities. And a client module may be coupled to the client server to which handle the interfacing of the client server to the flash server to access said remediation signatures.

In another embodiment, computer-readable media tangibly embodying a program of instructions executable by a computer to perform a process for resolving vulnerabilities in a computer comprises aggregating vulnerability information on a plurality of computer vulnerabilities; constructing a remediation database of said plurality of computer vulnerabilities; constructing a remediation signature to address a computer vulnerability; and deploying said remediation signature to a client computer.

DETAILED DESCRIPTION OF EMBODIMENTS

In this disclosure, numerous specific details are set forth to provide a sufficient understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, some details have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise. Certain terms are used throughout the following description and claims to refer to particular system components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical or communicative connection. Thus, if a first device couples to a second device, that connection may be through a direct connection, or through an indirect connection via other devices and connections. Finally, the terms "remediate" and "remediation" are used to refer generally to addressing or resolving vulnerabilities by reducing or alleviating the security risk presented by the subject vulnerability.

Figure 1:
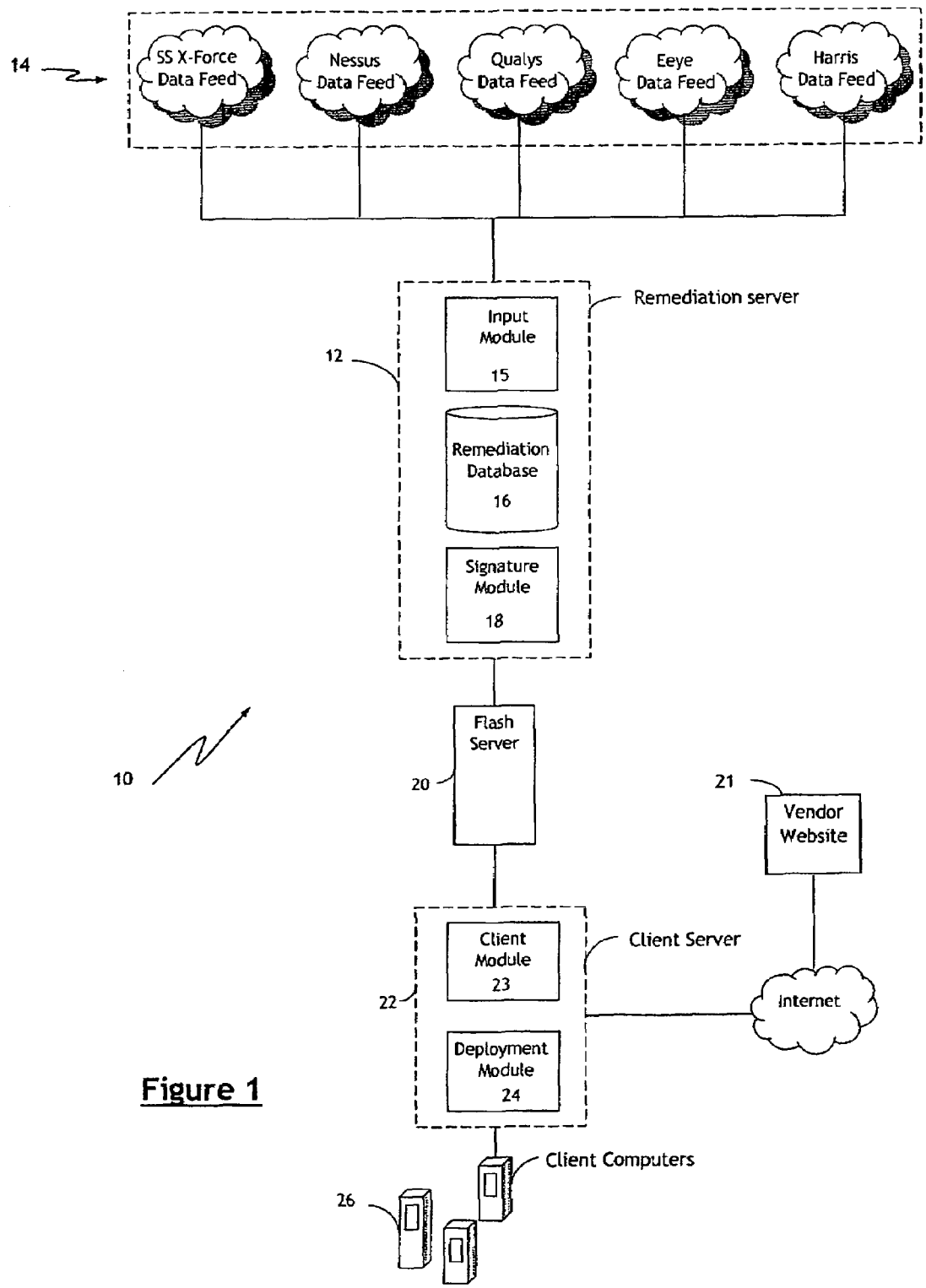
FIG. 1 is a block diagram illustrating an embodiment of a vulnerability resolution system in accordance with the present invention.

FIG. 1 illustrates an embodiment of a vulnerability resolution system 10 in accordance with the present invention. As shown in FIG. 1, the system 10 comprises a remediation server 12 coupled to a plurality of intelligence agents 14.

The remediation server 12 is also coupled to an import module 15, a remediation database 16, and a signature module 18. In this embodiment, the import module 15, remediation database 16, and signature module 18 are incorporated in the remediation server 12. For instance, the import module 15, remediation database 16, and signature module 18 may be stored in memory on the remediation server 12. It is also contemplated, however, that the import module 15, remediation database 16, and signature module 18 could be remotely coupled to the remediation server 12.

A flash server 20 is also coupled to the remediation server 12. A client server 22 is coupled to the flash server 20. A client module 23 and deployment module 24 are coupled to the client server 22. In this embodiment, the client module 23 and deployment module 24 are incorporated in the client server 22. For instance, the client module 23 and deployment module 24 may be stored in memory on the client server 22. It is also contemplated, however, that the client module 23 and deployment module 24 could be remotely coupled to the client server 22. And finally, a plurality of client computers 26 are coupled to the client server 22.

In the operation of the system 10, the remediation server 12 obtains information relating to computer security vulnerabilities from the intelligence agents 14. The import module 15 provides the necessary interface between the remediation server 12 and the various intelligence agents having such information. Examples of intelligence agents include: ISS Internet Scanner, QualysGuard, Nessus, Eeye, Harris, Retina, Microsoft's hfNetCheck, and others. The vulnerability information may come in many forms from these agents. Two such forms include 1) general information from security intelligence organizations relating to known security vulnerabilities, such as vulnerabilities in widespread software applications like Microsoft Windows; and 2) specific information from scanning services relating to specific vulnerabilities found during a security scan of a client's computer or computer system 26. The remediation server 12 aggregates the vulnerability information obtained, from whatever source, into a remediation database 16. While aggregating the information into the database 16, the remediation server 12 may manipulate the information in many ways. For example, the server 12 may strip unnecessary information out, may sort the information into related vulnerabilities or otherwise, may remove duplicate information, may identify or associate certain related vulnerabilities, etc.

In addition, the remediation server 12 uses a signature module 18 to generate remediation signatures for the vulnerabilities. Typically, a remediation signature is a list of actions taken to address or resolve a vulnerability. In this embodiment, the remediation signatures include the following types of remediation actions: service management, registry management, security permissions management, account management, policy management, audit management, file management, process management, as well as service pack, hot fix and patch installation. These types of remediation actions are generally known in the computer security industry.

A remediation signature may address one or more vulnerabilities. For clarity of explanation, however, it will be assumed that in this embodiment each remediation signature addresses a single vulnerability or type of vulnerability. In an embodiment of this system, the remediation signatures are generated as abstract objects which can be developed and implemented across multiple platforms without the need to change the underlying source code used in the remediation system. This allows for the creation of a remediation signature in the environment of the remediation system which can then be utilized in whatever system or environment the remediation system is operating. The process of constructing a remediation signature may be entirely automatic or it may involve some manual intervention, or a combination of both. In fact, some intelligence agents 14 may actually provide or suggest remediations along with the vulnerability information provided. Depending on the level of complexity of the vulnerability, a corresponding level of complexity may be required for the remediation signature. For example, some vendors provide "patches" or "fixes" or "updates" that address vulnerabilities in their hardware or software via their vendor website. A signature may therefore include direction to go to a vendor website and retrieve a patch or an update as one of the actions undertaken to remediate a computer's vulnerabilities. Given the potential complexity of the signatures, they may not always operate successfully as initially constructed. Accordingly, the signature module 18 or remediation server 12 may have the ability to test and approve the constructed signature in order to ensure that it successfully resolves the intended vulnerability and does not have any unintended deleterious effects.

Once a remediation signature has been constructed, in this embodiment of the system 10 the remediation signature is assigned or otherwise associated with the corresponding vulnerability in the remediation database 16. Accordingly, the remediation database 16 may include the vulnerability information and the corresponding remediation signatures for the vulnerabilities identified. Alternatively, it is contemplated that the signatures could be stored elsewhere and remotely associated via a pointer or otherwise to their corresponding vulnerabilities.

Remediation signatures and vulnerability information can be posted to the flash server 20 for dissemination. Typically, only after the remediation signature has been tested and approved is it released or uploaded to the flash server 20 for dissemination to clients seeking resolution of their computer vulnerabilities. A client server 22 can then download the desired information from the flash server 20. In this embodiment, a download is typically initiated by a user, such as an IT or computer security personnel. The client server 22 may connect to the flash server 20 in many ways including the Internet or a direct dial-up connection. In this embodiment of the system, the client module 23 provides the necessary interface logic to download the information from the flash server 20. Typically, a client server 22 will periodically download information from the flash server 20 to check for updated vulnerability and remediation information. The client server 22 may also access vendor websites 21, via a global network such as the Internet or otherwise, to obtain additional patches or updates as needed for remediation. In this embodiment of the system 10, the client server 22 analyzes and interprets the signatures downloaded from the flash server 20. If a signature specifies a needed update or patch from a vendor website 21, the client server 22 will connect to the website and download the needed information making the patch or update available locally for remediation of any client computers 26 coupled to the client server 22.

In this embodiment, it is also contemplated that the client server 22 will keep a profile of the client computers 26 coupled thereto. The profile of the client computers 26 essentially records or logs the system information relating to the client computers 26. Primarily, the profile contains information regarding remediation performed on the client computer 26. It is contemplated, however, that the profile might also contain information regarding the formatting of the client computer 26, the software applications and versions running on the computer 26, etc., which might be helpful in managing security issues on the subject computer. By comparing the computer profiles with the vulnerability and remediation information downloaded from the flash server 20, the client server 22 can track what remediation may be required for each client computer 26. In addition, the client server 22 can manage the vulnerability resolution process for each client computer 26. For instance, the client server 22, or security or IT personnel via the server, could select which remediation signatures should be deployed to each client computer 26, or which vulnerabilities should or should not be addressed. In addition, vulnerability resolution can be managed by scheduling the various resolution events. For instance, when and how often the client computers 26 are scanned for vulnerabilities can be scheduled, as well as the timing of the deployment of the remediation signatures to address those vulnerabilities.

By managing the vulnerability resolution, the remediation of vulnerabilities can be more reliably and more cost effectively addressed. In particular, the remediation can occur in off hours to minimize impact on the productivity of the client computers 26. The remediation can be selectively implemented. The remediation can be tracked and logged so that remediations are not accidentally overwritten or undone. And, the remediation can be accomplished automatically from the client server 22 as opposed to having to perform or install the remediation manually on each client computer, a virtually impossible task for some large-scale companies.

Figure 2:
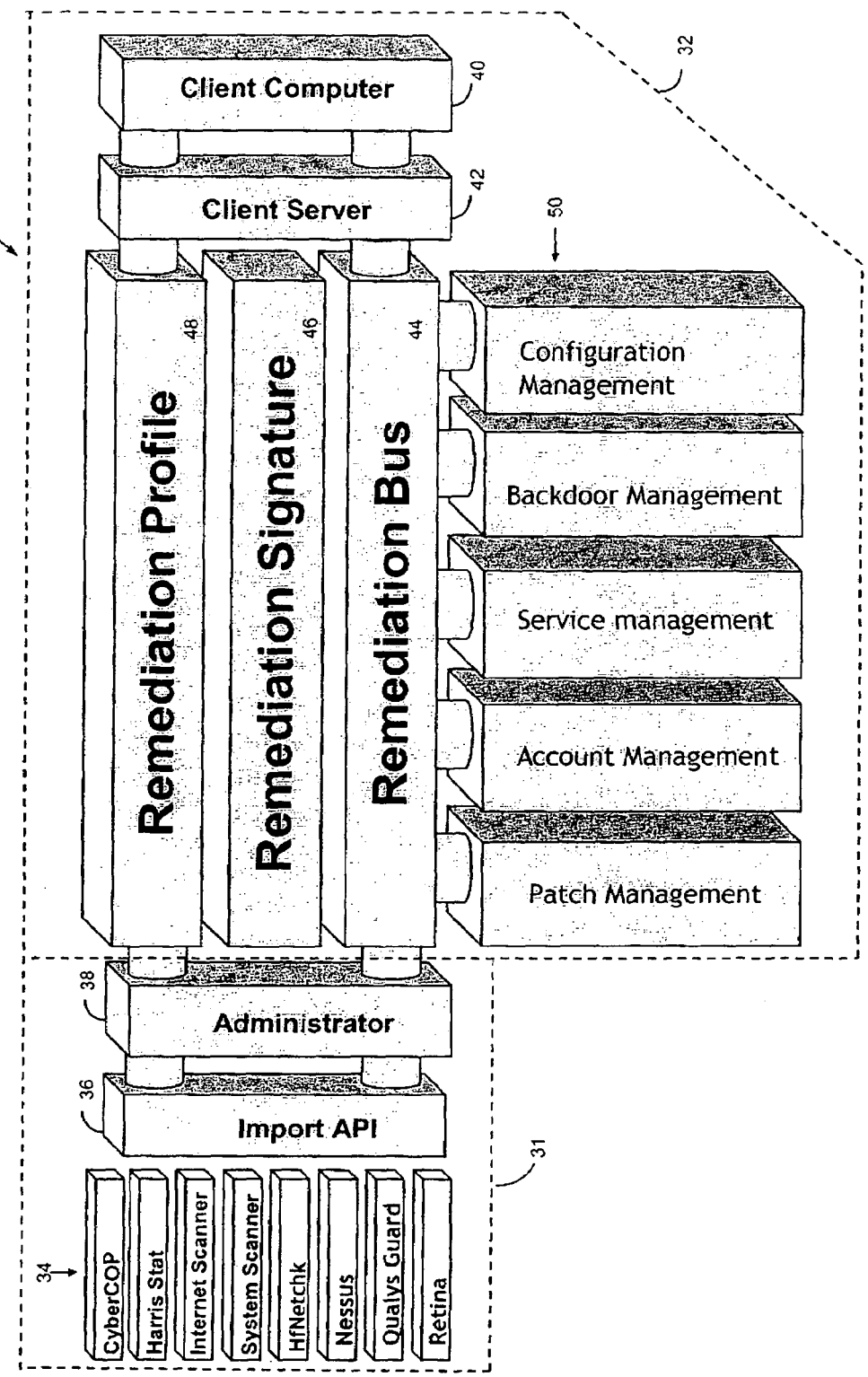
FIG. 2 is a block diagram illustrating another embodiment of a vulnerability resolution system in accordance with the present invention.

FIG. 2 is a block diagram providing another illustration of an embodiment of a vulnerability resolution system 30 in accordance with the present invention. More particularly, FIG. 2 provides another way to visualize the architecture of a vulnerability system in accordance with the present invention. As shown in FIG. 2, the architecture of this embodiment of the vulnerability system 30 generally comprises an aggregation section 31 and a remediation section 32. The aggregation section 31 of the architecture is essentially responsible for obtaining and aggregating the computer security vulnerability information while the remediation section 32 is essentially responsible for constructing remediation signatures for the identified vulnerabilities and deploying those remediations to client computers in a managed and automated manner.

As shown in FIG. 2, the aggregation section 31 of the system architecture 30 comprises intelligence agents 34, an import API or interface 36, and an administrator 38. The import API 36 provides an interface to the intelligence agents 34. As discussed in reference to FIG. 1 above, the intelligence agents 34 provide information regarding computer security vulnerabilities. As noted, these intelligence agents 34 may include automated vulnerability assessment tools, security intelligence services, manufacturers of computer hardware or software, etc. The administrator 38 obtains this vulnerability information from the intelligence agents 34 via the import API 36. The import API 36 typically includes several interfaces or import wizards as required to allow importation of vulnerability assessment data from the variety of intelligence agents available. Generally, the intelligence agents 34 provide information specifying the necessary interface. Once retrieved, the vulnerability information may be aggregated, sorted, selected or otherwise managed via the administrator 38.

The remediation section 32 of the system architecture 30 ultimately uses the vulnerability information retrieved by the aggregation section 31 to remediate vulnerabilities on client computers 40. The client computers 40 are shown coupled to a client server 42. The client server 42 allows for automated and managed deployment of the remediation signatures to the client computers 40. The architecture of the remediation section 32 illustrates that the vulnerability information from the aggregation section 31 is conveyed to the client server 42 and client computers 40 via the remediation bus 44, remediation signature 46, and remediation profile 48. As discussed above, the remediation signature 46 is essentially a group of actions which can be taken to address or resolve a vulnerability. The signature may be provided by the intelligence agents 34 with the vulnerability information or, more typically, it may need to be constructed in response to the vulnerability information received. The construction may include some automated creation and/or some manual creation of the appropriate actions to be taken to address the subject vulnerability. Also as discussed, the remediation profile 48 contemplates a record or log of system information relating to the client computers 40 or client servers 42. For instance, the profile may contain information regarding the formatting of the client computers 40 or server 42, the software applications and versions running on the computers 40 or servers 42, the remediation signatures already implemented on the computers 40 and servers 42, the remediation history of the computers 40, etc. By comparing the computer profiles with the vulnerability and remediation information obtained, what remediation may be required for each computer 40 or server 42 can be tracked. FIG. 2 also illustrates that the remediation types or groups 50 in this embodiment include configuration management, backdoor management, service management, account management, and patch management. The available remediation groups are coupled to the remediation bus 44. It is contemplated that other remediation types or groups may be included as well.

Figure 3:
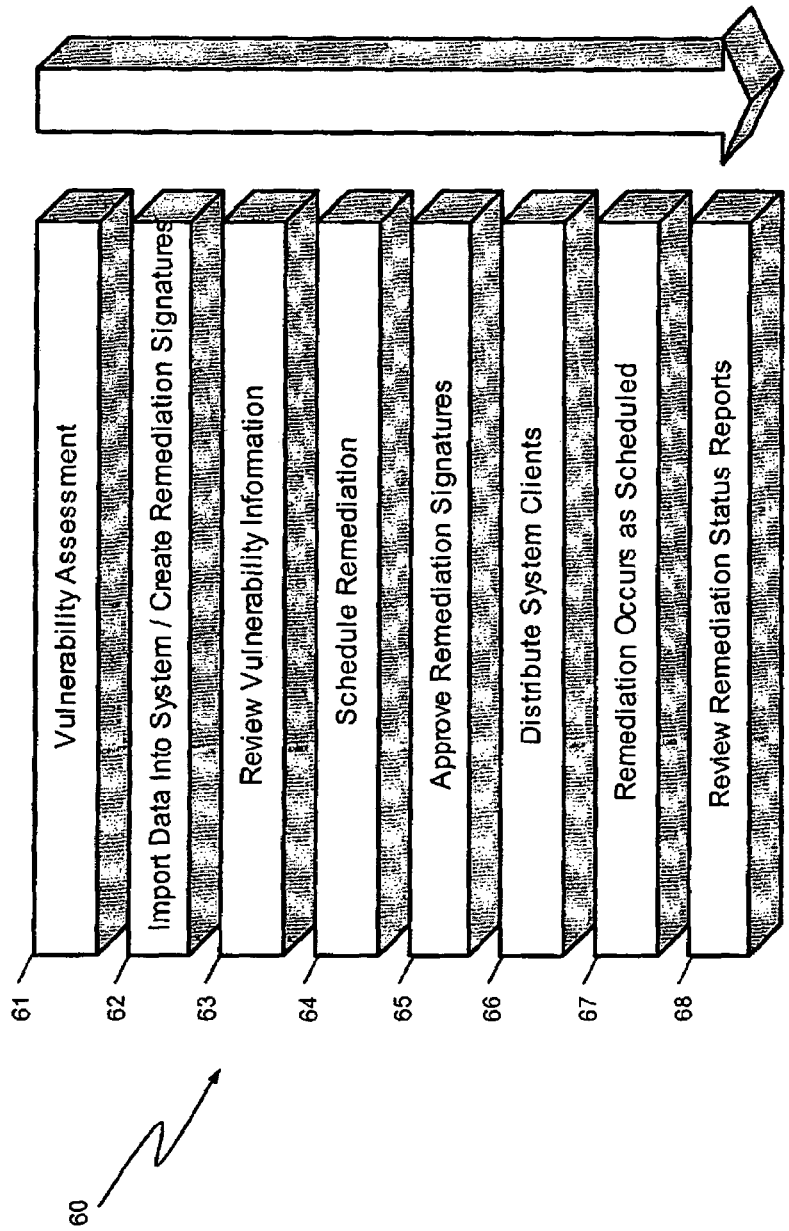
FIG. 3 is a flow chart illustrating an overview of an embodiment of a computer vulnerability remediation process in accordance with the present invention.

FIG. 3 is a flow chart illustrating an overview of an embodiment of a computer vulnerability remediation process in accordance with the present invention. The remediation process 60 begins with vulnerability assessment in box 61. Vulnerability assessment comprises using automated assessment tools and audit processes, intelligence agents, to verify the existence of known vulnerabilities on a given computer or computer network. This assessment process may also include device discovery; that is, the mapping of network and subnetwork components to be assessed and identifying the devices that will be targeted for vulnerability assessment. In box 62, the vulnerability information is imported or aggregated in the system, typically in a remediation database, and remediation signatures can be constructed to address the identified vulnerabilities. As noted, the remediation signatures are typically associated with the corresponding vulnerabilities in the remediation database. The vulnerability information is then reviewed in box 63. The review process typically includes analyzing the vulnerability information to prioritize and identify vulnerabilities for remediation, as well as acceptable risks (i.e., where no remediation is required). As indicated in box 64, the remediation can then be scheduled to occur when, where, and how desired. This allows the remediation to occur in off-peak times to reduce interference with normal computer operations, on only the identified target computers, and in the manner desired. In box 65, the remediation signatures are approved for dissemination to the client's target computers. This contemplates that remediation signatures can be selectively deployed. In addition, signatures designed to address the vulnerabilities identified may be tested and revised before approving the signatures for deployment. Once approved, the remediation signatures and vulnerability information are distributed to the system clients in box 66 for use on the client's computers. Then, remediation can occur as scheduled in box 67. Finally, the remediation undertaken can be reviewed to ensure the remediation was completed successfully via status reports or otherwise. In addition, remediation events may be logged or otherwise recorded to preserve the remediation information. Such information may be included in profiles for the client computers. As noted, such profiles may include information about the target devices such as system configuration, software, and prior remediation actions or a remediation history. Having such information allows for managed remediation of the client computers in the future. Overall then, the embodiment of the remediation process of FIG. 3 presents vulnerability assessment, vulnerability remediation, and vulnerability management as contemplated by the present invention.

Figure 4:
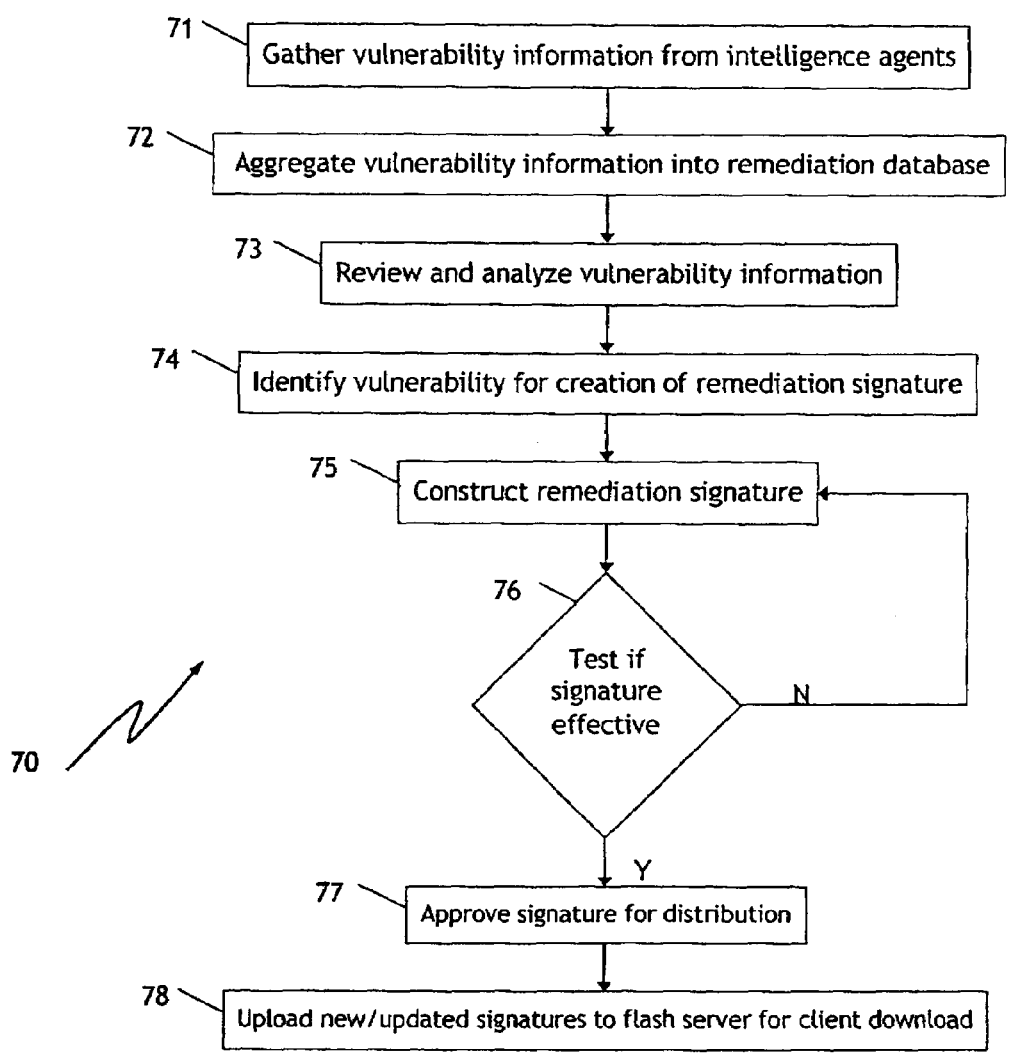
FIG. 4 is a flow chart illustrating an embodiment of an aggregation and construction process for computer vulnerability remediation in accordance with the present invention.

FIG. 4 is a flow chart illustrating an embodiment of an aggregation and construction process for computer vulnerability remediation in accordance with the present invention. Essentially, the aggregation and construction process 70 can be viewed as a subprocess of the overall remediation process. The process 70 begins in box 71 with the gathering of vulnerability information from intelligence agents. As previously noted, these intelligence agents include automated vulnerability assessment tools, security intelligence services, manufacturers of computer hardware or software, etc. The vulnerability information retrieved from the intelligence agents is then aggregated in a remediation database as indicated in box 72. In box 73, the vulnerability information is then reviewed and analyzed. This may include sorting the information into related vulnerabilities or otherwise, categorizing or identifying certain related vulnerabilities, prioritizing vulnerabilities, etc. As indicated in box 74, vulnerabilities are identified for creation of remediation signatures. A remediation signature resolves or addresses a vulnerability or type of vulnerability. A remediation signature is then constructed in box 75. As noted, a remediation signature is a group of actions which addresses or resolves the subject vulnerability; for instance, modifying registry settings, changing security permissions, installing patches, etc. The creation of a remediation signature may be completely automated or may include some manual input as well. In box 76, the remediation signature is tested to see if it effectively resolves or addresses the target vulnerability. If not, the process returns to box 75 and another remediation signature is constructed, then retested in box 76. Once an effective signature has been constructed, the process continues to box 77. In box 77, selected signatures may be approved for distribution to clients. Approved signatures are then uploaded to a flash server making them available for download by clients in box 78. In this way, new and updated remediation signatures which address or resolve identified vulnerabilities are made available for download by clients.

Figure 5A:
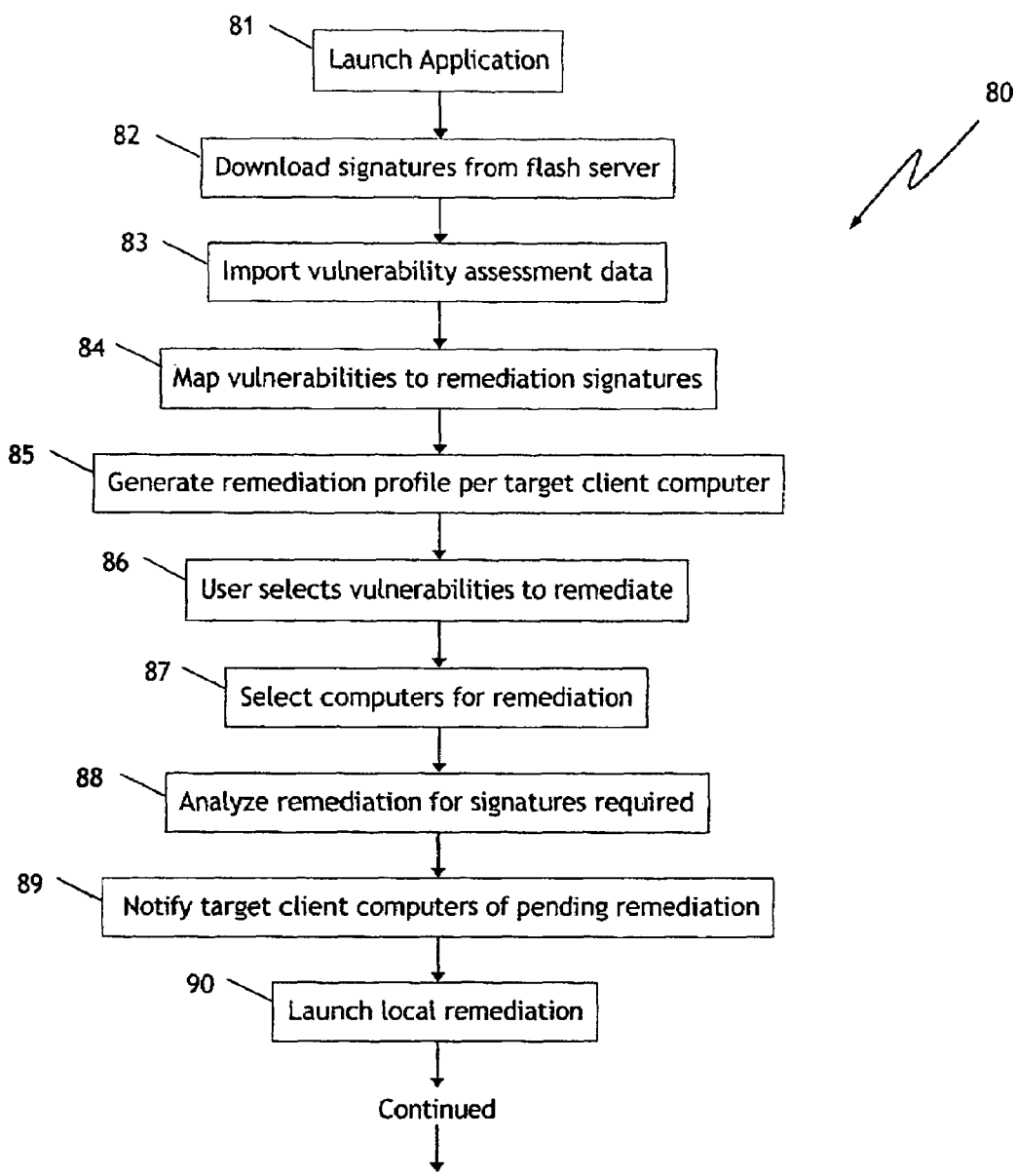
FIGS. 5A and 5B are a flow chart illustrating an embodiment of a remediation management process for computer vulnerability remediation in accordance with the present invention.
Figure 5B:
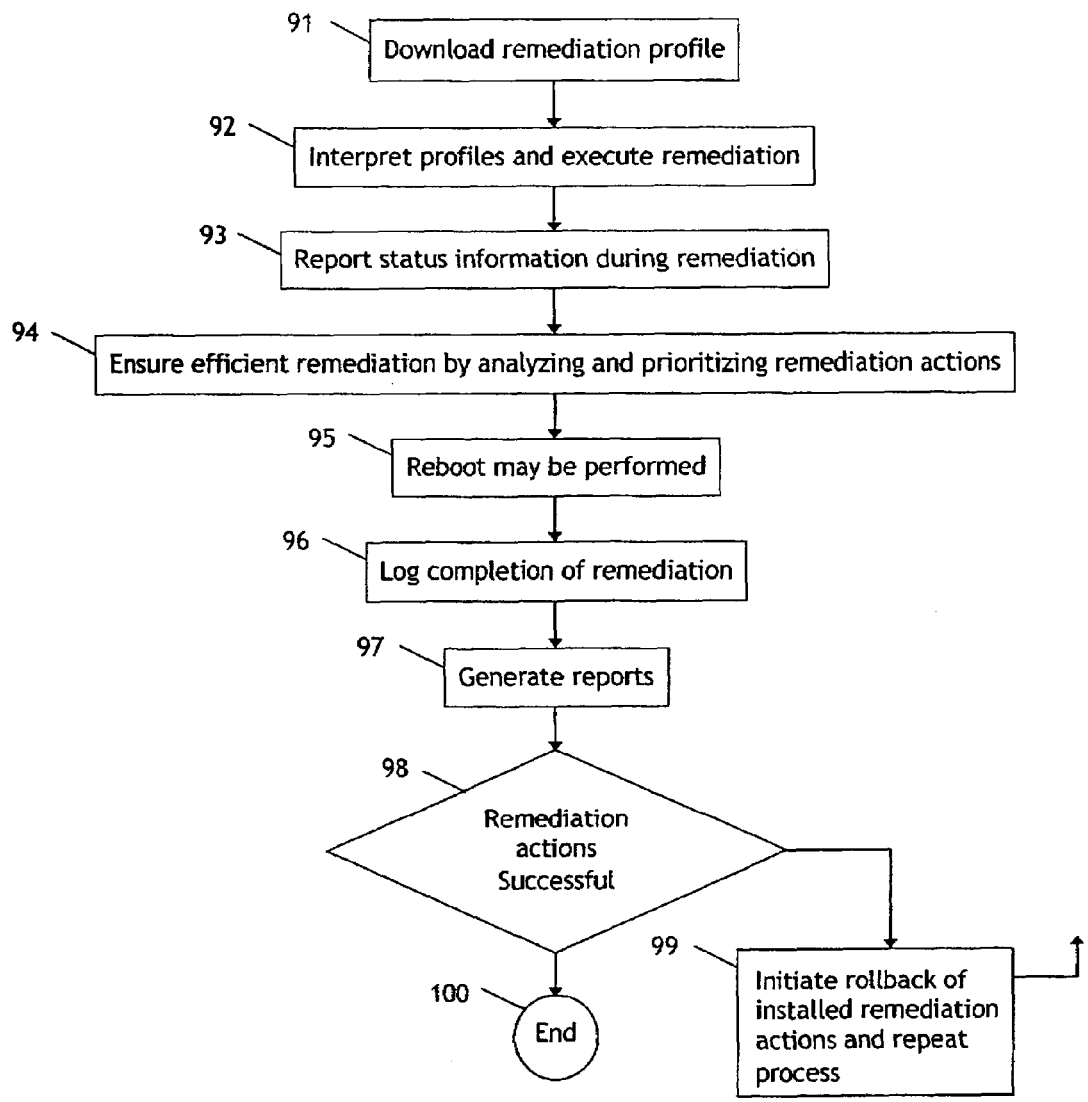

FIGS. 5A and 5B are a flow chart illustrating an embodiment of a remediation management process for computer vulnerability remediation in accordance with the present invention. Essentially, the aggregation and construction process 70 can be viewed as a subprocess of the overall remediation process. This embodiment of the remediation management process 80 is typically a software application installed on a client server which is coupled to a plurality of target client computers which may require remediation of security vulnerabilities. Accordingly, the process 80 begins in box 81 by launching the application. In box 82, available remediation signatures and vulnerability information are downloaded, typically from a flash server. In box 83, vulnerability assessment data is imported. Typically, this vulnerability assessment data comes from scanning tools which have scanned or analyzed the target computers for which remediation is being considered. The vulnerability assessment data includes information regarding the security vulnerabilities found on the target computers or devices. Based on the vulnerabilities identified on the target computers, the vulnerabilities are then mapped to remediation signatures in box 84. In this embodiment, mapping of the identified vulnerabilities to corresponding remediation signatures occurs by referencing the remediation database information downloaded from the flash server. It is contemplated, however, that this information may have been previously downloaded, remotely accessed, or presently downloaded to make the necessary correlation between vulnerabilities and available signatures. A remediation profile is then generated for each target computer in box 85. As noted, the profile typically includes information regarding the vulnerabilities identified on the target client computer as well as the corresponding signatures to address those vulnerabilities. In box 86, the client user, typically an IT person or other computer security personnel, is given the opportunity to select which vulnerabilities should be remediated. Generally, the selection is made by reviewing the information regarding vulnerabilities, proposed signatures, and profiles. The selection and review may be made for each computer or by vulnerability. For example, a particular computer could be selected not to receive any remediation, perhaps because the computer does not pose a significant security risk, the vulnerabilities on the computer are not significant, the processes running on the computer cannot be interrupted for remediation, etc. Alternatively, a particular vulnerability could be deselected for all target client computers, such that the vulnerability would not be remediated on any of the target computers, perhaps because the vulnerability dose not pose a sufficient security risk, the remediation signature is deemed too risky, etc. Once the user has selectively managed which vulnerabilities will be remediated, the user can then select which computers will be approved to receive remediation in box 87. In box 88, the proposed remediation is analyzed to determine which remediation signatures will be required. In box 89, the target client computers that are to receive remediation are notified that a remediation is to occur. In this embodiment, the notification essentially comprises a message passed to a local remediation application installed on each client computer. Included in the remediation notification may be when the remediation is scheduled to occur. For instance, the remediation can be scheduled to occur at the instance of a particular event, such as a user logging off the machine, logging in, or any other action. In addition, the remediation may be scheduled to occur at a particular time. Thus, using the target client computer's local clock the remediation can be initiated at the scheduled time. Or alternatively, the remediation could occur as soon as the notification is received at the target client computer. Regardless of the triggering event, when the trigger is met the local remediation is launched in box 90.

The process 80 continues in FIG. 5B. Once the remediation is launched, the remediation profile for the client computer is then downloaded in box 91. Typically, the profile is downloaded from the client server on which the client remediation management process application is running, i.e., the server that sent the notification of the pending remediation initially. The profile is then interpreted and the remediation signatures and actions specified in the profile are executed as indicated in box 92. As noted in box 93, during remediation the status of the remediation may be reported to the client server and monitored. In addition, the remediation steps may be prioritized and analyzed to ensure the most efficient sequence of execution as indicated in box 94. As noted in box 95, a reboot may need to be performed for some of the remediation actions to take effect. Completion of the remediation on the target client computer is then logged to the client server in box 96. Once remediation is completed, box 97 indicates that reports are generated indicative of the effect of the remediation. Whether the remediation was successful or not is determined in box 98. If the remediation is not deemed successful, either because it did not resolve the identified vulnerabilities as evidenced by an additional security scan of the client computer, or because the remediation actions had unintended deleterious effects, etc., then the remediation can be rolled back or undone and the remediation process can be repeated as indicated in box 99. If the remediation is deemed successful, i.e., vulnerabilities resolved and no deleterious effects for example, then the process ends in box 100. In this manner, the new and updated remediation signatures made available to address or resolve identified vulnerabilities can be downloaded and used in an automated and managed remediation deployment to target client computers.

While the present invention has been illustrated and described in terms of particular apparatus and methods of use, it is apparent that equivalent parts may be substituted for those shown and other changes can be made within the scope of the present invention as defined by the appended claims.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A system for resolving computer vulnerabilities, comprising:

a remediation server capable of coupling to a security intelligence agent having information about computer vulnerabilities in order to aggregate said vulnerability information into a remediation database;

a signature module coupled to said remediation server to construct a remediation signature for each vulnerability;

a download server coupled to said signature module to provide remote access to said remediation signatures;

a client server capable of coupling to said download server to access said remediation signatures;

a deployment module coupled to said client server capable of deploying said remediation signatures to a client computer coupled to said client server; wherein said deployment module constructs a remediation profile for each client computer, wherein said remediation profile comprises remediation signatures to resolve vulnerabilities on said client computer;

wherein a remediation signature comprises an automated sequence of actions which may be taken with respect to a client computer to modify the client computer to address a corresponding vulnerability on the client computer:

wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

2. The system of claim 1 further comprising:
a scanner capable of scanning said client computer to identify vulnerabilities;
a mapping module coupled to the client server capable of mapping said identified vulnerabilities to remediation signatures;
wherein said remediation profile comprises at least one identified vulnerability on the client computer and selectively included remediation signatures mapped to the identified vulnerabilities.

3. The system of claim 2, wherein the scanner is an independent scanner and further comprising:
an import module coupled to the client server capable of importing the identified vulnerabilities for the client computer.

4. The system of claim 1 wherein selective inclusion of said remediation signatures in said remediation profiles comprises inclusion of selected but not all remediation signatures.

5. The system of claim 1 wherein selective inclusion of said remediation signatures in said remediation profiles comprises inclusion of a remediation signature to selected but not all of the profiles of the plurality of computers in the network.

6. A system for resolving computer vulnerabilities, comprising:
a remediation server capable of coupling to a security intelligence agent having information about computer vulnerabilities in order to aggregate said vulnerability information into a remediation database;
a signature module coupled to said remediation server to construct a remediation signature for each vulnerability;
a download server coupled to said signature module to provide remote access to said remediation signatures;
a client server capable of coupling to said download server to access said remediation signatures;
a deployment module coupled to said client server capable of deploying said remediation signatures to a client computer coupled to said client server; wherein said deployment module constructs a remediation profile for each client computer, wherein said remediation signatures can be selectively included in said remediation profile;
wherein a remediation signature comprises an automated sequence of actions which may be taken with respect to a client computer to modify the client computer to address a corresponding vulnerability on the client computer:
wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

7. The system of claim 6 wherein there are a plurality of remediation signatures and wherein the plurality of remediation signatures comprise all of the following remediation types: service management, registry management, security permissions management, account management, policy management, audit management, file management, process management, and patch installation.

8. The system of claim 6, wherein said remediation profile comprises remediation signatures to resolve vulnerabilities on said client computer.

9. The system of claim 8 further comprising:
a scanner capable of scanning said client computer to identify vulnerabilities;
a mapping module coupled to the client server capable of mapping said identified vulnerabilities to remediation signatures;
wherein said remediation profile comprises at least one identified vulnerability on the client computer and selectively included remediation signatures mapped to the identified vulnerabilities.

10. The system of claim 9, wherein the scanner is an independent scanner and further comprising:
an import module coupled to the client server capable of importing the identified vulnerabilities for the client computer.

11. The system of claim 8 wherein selective inclusion of said remediation signatures in said remediation profiles comprises inclusion of selected but not all remediation signatures.

12. The system of claim 8 wherein selective inclusion of said remediation signatures in said remediation profiles comprises inclusion of a remediation signature to selected but not all of the profiles of the plurality of computers in the network.

13. A method for resolving vulnerabilities in a plurality of computers in a network, comprising:
aggregating vulnerability information on a plurality of computer vulnerabilities;
constructing a remediation database of the plurality of computer vulnerabilities;
constructing at least one remediation signature to address a computer vulnerability; and deploying at least one remediation signature to at least a portion of the plurality of client computers; wherein the deploying of the remediation signatures comprises managing vulnerability resolution for the plurality of computers in the network;
wherein managing vulnerability resolution comprises selective resolution of vulnerabilities; wherein at least a portion of the plurality of client computers in the network are scanned and vulnerabilities identified and wherein selective resolution of vulnerabilities comprises resolution of an identified vulnerability in selected but not all of the plurality of computers in the network having the identified vulnerability;
wherein scanning and identifying comprises:
using an independent scanner to scan the at least a portion of the plurality of client computers in the network;
importing vulnerabilities on the at least a portion of the plurality of client computers in the network identified by the independent scanner;
and mapping the identified vulnerabilities to corresponding remediation signatures;
wherein a remediation signature comprises an automated sequence of actions which may be taken with respect to a client computer to modify the client computer to address a corresponding vulnerability on the client computer:

wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

14. The system of claim 13 wherein there are a plurality of remediation signatures and wherein the plurality of remediation signatures comprise all of the following remediation types: service management, registry management, security permissions management, account management, policy management, audit management, file management, process management, and patch installation.

15. The method of claim 13, wherein selective resolution of vulnerabilities comprises resolution of an identified vulnerability in selected but not all of the plurality of computers in the network having the identified vulnerability.

16. The method of claim 13, wherein selective resolution of at least one identified vulnerability comprises resolution of selected but not all of the identified vulnerabilities for which corresponding remediation signatures have been mapped.

17. The method of claim 13 wherein the aggregating of vulnerability information comprises obtaining vulnerability information from at least two security intelligence agents.

18. The method of claim 17 wherein the security intelligence agents comprise a database of information regarding known computer vulnerabilities.

19. The method of claim 17 wherein the security intelligence agents comprise a scanning service.

20. The method of claim 13 wherein constructing a remediation database further comprises associating each remediation signature to a corresponding computer vulnerability.

21. The method of claim 13 wherein constructing a remediation database further comprises constructing, testing and approving a remediation signature corresponding to a vulnerability.

22. The method of claim 13 wherein deploying at least one remediation signature comprises constructing a remediation profile for a client computer to address vulnerabilities on that computer.

23. The method of claim 13 wherein the remediation profile comprises selected remediation signatures for the client computer corresponding to vulnerabilities on the client computer.

24. The method of claim 13 further comprising downloading at least one remediation signature to a client server on the network and wherein deploying at least one remediation signature to at least a portion of the plurality of client computers comprises deploying at least one remediation signature from the client server.

25. The method of claim 24 wherein downloading at least one remediation signature comprises providing remote access to at least one remediation signature by uploading at least one approved remediation signature to a download server for remote access by client servers and subsequently downloading at least one remediation signature from the download server to a client server.

26. A method for resolving vulnerabilities in a plurality of computers in a network, comprising:
aggregating vulnerability information on a plurality of computer vulnerabilities;
constructing a remediation database of the plurality of computer vulnerabilities;
constructing at least one remediation signature to address a computer vulnerability;
using a scanner to scan at least a portion of the plurality of client computers in the network;
recording vulnerabilities identified by the scanner on the scanned portion of the plurality of client computers in the network;
mapping the identified vulnerabilities to corresponding remediation signatures;
managing vulnerability resolution by selectively resolving at least one identified vulnerability on at least a selected portion of the scanned portion of the plurality of client computers by deploying at least one remediation signature to the selected portion of the scanned portion of the plurality of client computers and using the deployed signature to remediate the identified vulnerability on the selected portion of the scanned portion of the plurality of client computers;
wherein a remediation signature comprises an automated sequence of actions which may be taken with respect to a client computer to modify the client computer to address a corresponding vulnerability on the client computer:
wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

27. The system of claim 26 wherein there are a plurality of remediation signatures and wherein the plurality of remediation signatures comprise all of the following remediation types: service management, registry management, security permissions management, account management, policy management, audit management, file management, process management, and patch installation.

28. The method of claim 26, wherein selective resolution of vulnerabilities comprises resolution of an identified vulnerability in selected but not all of the plurality of computers in the network having the identified vulnerability.

29. The method of claim 26 wherein selective resolution of at least one identified vulnerability comprises resolution of selected but not all of the identified vulnerabilities for which corresponding remediation signatures have been mapped.

30. The method of claim 26 wherein the scanner is an independent scanner and wherein recording vulnerabilities comprises importing vulnerabilities from the independent scanner.

31. A system for resolving computer vulnerabilities, comprising:
a remediation server capable of coupling to a security intelligence agent having information about computer vulnerabilities in order to aggregate said vulnerability information into a remediation database;
a signature module coupled to said remediation server to construct a remediation signatures, each remediation signature corresponding to a vulnerability;
a client server capable of receiving said remediation signatures;

a deployment module coupled to said client server capable of deploying said remediation signatures to a client computer coupled to said client server; wherein said deployment module constructs a remediation profiles, each remediation profile corresponding to a client computer, wherein said remediation profiles comprise remediation signatures to resolve vulnerabilities on said corresponding client computers;

wherein a remediation signature comprises an automated sequence of actions which may be taken with respect to a client computer to modify the client computer to address a corresponding vulnerability on the client computer:

wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

32. A system for resolving computer vulnerabilities comprising:

a remediation server capable of coupling to a security intelligence agent having information about computer vulnerabilities in order to aggregate said vulnerability information into a remediation database;

a signature module coupled to said remediation server to construct a remediation signatures, each remediation signature corresponding to a vulnerability;

a client server capable of receiving said remediation signatures;

a deployment module coupled to said client server capable of deploying said remediation signatures to a client computer coupled to said client server; wherein said deployment module constructs a remediation profiles, each remediation profile corresponding to a client computer, wherein said remediation signatures can be selectively included in said remediation profiles;

wherein a remediation signature comprises an automated sequence of actions which may be taken with respect to a client computer to modify the client computer to address a corresponding vulnerability on the client computer:

wherein there are a plurality of remediation signatures and wherein the plurality of remediation signatures comprise at least one remediation signature of the registry management type, at least one remediation signature of the patch installation type and at least one remediation signature of at least one of the following additional remediation types: service management, security permissions management, account management, policy management, audit management, file management and process management.

33. The system of claim 32 wherein said remediation profiles comprise remediation signatures to resolve vulnerabilities on said corresponding client computers.

34. The system of claim 33 further comprising:

a scanner capable of scanning said client computer to identify vulnerabilities;

a mapping module coupled to the client server capable of mapping said identified vulnerabilities to remediation signatures;

wherein said remediation profile comprises at least one identified vulnerability on the client computer and selectively included remediation signatures mapped to the identified vulnerabilities.

35. The system of claim 34, wherein the scanner is an independent scanner and further comprising:

an import module coupled to the client server capable of importing the identified vulnerabilities for the client computer.

36. The system of claim 33 wherein selective inclusion of said remediation signatures in said remediation profiles comprises inclusion of selected but not all remediation signatures.

37. The system of claim 33 wherein selective inclusion of said remediation signatures in said remediation profiles comprises inclusion of a remediation signature to selected but not all of the profiles of the plurality of computers in the network.

38. A system for resolving computer vulnerabilities in a plurality of computers on a network comprising:

a remediation server capable of coupling to a security intelligence agent having information about computer vulnerabilities in order to aggregate said vulnerability information into a remediation database;

a signature module coupled to said remediation server to construct a remediation signatures, each remediation signature corresponding to a vulnerability;

a client server capable of receiving said remediation signatures;

a deployment module coupled to said client server capable of deploying said remediation signatures to a selection of client computers coupled to said client server, wherein said deployment module constructs remediation profiles, each remediation profile corresponding to a client computer, wherein said remediation profiles comprise selectively included remediation signatures to resolve vulnerabilities on said corresponding client computers;

wherein a remediation signature comprises an automated sequence of actions which may be taken with respect to a client computer to modify the client computer to address a corresponding vulnerability on the client computer:

wherein there are a plurality of remediation signatures and wherein the plurality of remediation signatures comprise at least one remediation signature of the registry management type, at least one remediation signature of the patch installation type and at least one remediation signature of at least one of the following additional remediation types: service management security permissions management, account management, policy management audit management, file management and process management.

39. The system of claim 38 wherein there are a plurality of remediation signatures and wherein the plurality of remediation signatures comprise all of the following remediation types: service management, registry management, security permissions management, account management, policy management, audit management, file management, process management, and patch installation.

40. The system of claim 38 further comprising:

a scanner capable of scanning a portion of the plurality of client computers on the network to identify vulnerabilities on each of the scanned client computers;

a mapping module coupled to the client server capable of mapping said identified vulnerabilities to remediation signatures;

wherein each said remediation profile comprises at least one identified vulnerability on the client computer and selectively included remediation signatures mapped to the identified vulnerabilities.

41. The system of claim 40, wherein the scanner is an independent scanner and further comprising:
   an import module coupled to the client server capable of importing the identified vulnerabilities for the client computers.

42. The system of claim 38 wherein selective inclusion of said remediation signatures in said remediation profiles comprises inclusion of selected but not all remediation signatures.

43. The system of claim 38 wherein selective inclusion of said remediation signatures in said remediation profiles comprises inclusion of a remediation signature to selected but not all of the profiles of the plurality of computers in the network.

44. The system of claim 38 further comprising:
   a download server coupled to said signature module to provide remote access to said remediation signatures;
   wherein the client server is capable of coupling to said download server to receive said remediation signatures.

* * * * *

(12) EX PARTE REEXAMINATION CERTIFICATE (6405th)
United States Patent
Banzhof

(10) Number: US 7,000,247 C1
(45) Certificate Issued: Aug. 26, 2008

(54) AUTOMATED COMPUTER VULNERABILITY RESOLUTION SYSTEM

(75) Inventor: Carl E. Banzhof, Dallas, TX (US)

(73) Assignee: McAfee, Inc.

Reexamination Request:
No. 90/007,955, Mar. 2, 2006

Reexamination Certificate for:
| | |
|---|---|
| Patent No.: | 7,000,247 |
| Issued: | Feb. 14, 2006 |
| Appl. No.: | 10/335,490 |
| Filed: | Dec. 31, 2002 |

Related U.S. Application Data

(60) Provisional application No. 60/345,689, filed on Dec. 31, 2001.

(51) Int. Cl.
*G06F 7/04* (2006.01)

(52) U.S. Cl. .................................. 726/2; 726/3; 726/4
(58) Field of Classification Search .................. None
See application file for complete search history.

(56) References Cited

U.S. PATENT DOCUMENTS 6,990,660 B2    1/2006   Moshir

OTHER PUBLICATIONS

CERT Incident Note IN–2000–07, "Exploitation of Hidden File Extensions", Jul. 27, 2000, at CERT.org.

"State of the Practice of Intrusion Detection Technologies," Julia Allen et al., Jan. 2000, Networked Systems Survivability Program, cover through p. 120.

"State of the Practice of Intrusion Detection Technologies," Julia Allen et al., Jan. 2000, Networked Systems Survivability Program, p. 121 through Report Documentation Page (end).

U.S. App. No. 60/234,680, filed Sep. 22, 2000, Moshir.

"Review SPQUERY", in Network Computing, Nov. 2000, www.networkcomputer.co.uk/back_iss/prod_update/reviews/spquery4.1.htm.

"Ready for Windows 2000 Service Pack 1? St. Bernard Software's SPQuery 4.0 is Here Just in Time," in Business Wire, Aug. 2, 2000, www.findarticles.com/p/articles/mi_m0EIN/is_August_2/ai_63819686/print.

"Useful SPQuery 3.0 automates Finding, installing hotfixes," Mark Joseph Edwards, in Infoworld, Jun. 21, 1999, www.infoworld.com/cgi-bin/displayArchive.pl?/99/25/c04-25.46.htm.

SPQuery Users Manual, $1^{st}$ quarter 2001.

WebConsole Core 4.0 for NetWare, archived May 11, 2000, in Web.Archive.org, web.archive.org/web/20000511133746/www.patchlink.com/products/wenw_product...

Gravitix The Patch Finder, archived Aug. 15, 2000, in Web Archive.org.web.archive.org/web/20000815094824/www.patchlink.com/products/gravitix.asp.

"Ultimate Security Toolkit", Steve Manzuik, in NTSecurity, May 16, 2000, web.archive.org/web/2001160751/www.nt-security.net/Articles/Index.cfm?ArticleId=9202&SearchString=cyber.

(Continued)

*Primary Examiner*—Christopher E Lee

(57) ABSTRACT

A system and process for addressing computer security vulnerabilities. The system and process generally comprise aggregating vulnerability information on a plurality of computer vulnerabilities; constructing a remediation database of said plurality of computer vulnerabilities; constructing a remediation signature to address the computer vulnerabilities; and deploying said remediation signature to a client computer. The remediation signature essentially comprises a sequence of actions to address a corresponding vulnerability. A managed automated approach to the process in contemplated in which the system is capable of selective deployment of remediation signatures; selective resolution of vulnerabilities; scheduled deployment of remediation signatures; and scheduled scanning of client computers for vulnerabilities.

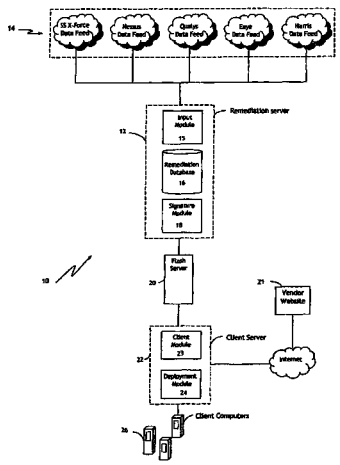

OTHER PUBLICATIONS

"Network Vulnerability Assessment Report", archived Sep. 17, 2000 in Web.archive.org, web.archive.org/web/20000917072109/documents.iss.net/literature/InternetScanner/reports/Line_Mgmt_Vulnerability_Assessment_Report.pdf.

"Host Vulnerability Summary Report", archived Sep. 17, 2000 in Web.archive.org, web.archive.org/web/20000917072216/documents.iss.net/literature/InternetScanner/reports/Technician_Host_Vulnerability_Summary_Report.pdf.

ISS SAFEsuite products: Internet Scanner, archived Aug. 20, 2000 in Web.archive.org, web.archive.org/web/20000820203428/www.iss.net/securing_e-business/security_pr...

"Internet Security Systems Internet Scanner", archived Jun. 6, 2001 in Web.archive.org, web.archive.org/web/2001060422406/documents.iss.net/literature/InternetScanner/is_ps.pdf.

"To Setup Secure PC Network:", archived Aug. 16, 2000 in Web.archive.org, web.archive.org/web/20000816192628/www.citadel.com/downloads/SPC+readme.txt.

"Microsoft Security Glossary", www.microsoft.com/security/glossary.mspx, published Oct. 29, 2002, updated Dec. 19, 2005.

US 7,000,247 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 13–25 is confirmed.

Claims 1, 3, 6, 10, 26, 30–32, 35, 38 and 41 are determined to be patentable as amended.

Claims 2, 4, 5, 7–9, 11, 12, 27–29, 33, 34, 36, 37, 39, 40 and 42–44, dependent on an amended claim, are determined to be patentable.

1. A system for resolving computer vulnerabilities, comprising:
   a remediation server capable of coupling to a security intelligence agent having information about computer vulnerabilities in order to aggregate said vulnerability information into a remediation database;
   a signature module coupled to said remediation server to construct a remediation signature for each vulnerability;
   a download server coupled to said signature module to provide remote access to said remediation signatures;
   a client server capable of coupling to said download server to access said remediation signatures;
   a deployment module coupled to said client server capable of deploying said remediation signatures to a client computer coupled to said client server; wherein said deployment module *independently* constructs a remediation profile for each client computer, wherein said remediation profile comprises remediation signatures to resolve vulnerabilities on said client computer;
   wherein a remediation signature comprises an automated sequence of actions which may be taken with respect to a client computer to modify the client computer to address a corresponding vulnerability on the client computer;
   wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

3. [The system of claim 2,] *A system for resolving computer vulnerabilities, comprising:*
   *a remediation server capable of coupling to a security intelligence agent having information about computer vulnerabilities in order to aggregate said vulnerability information into a remediation database;*
   *a signature module coupled to said remediation server to construct a remediation signature for each vulnerability;*
   *a download server coupled to said signature module to provide remote access to said remediation signatures;*
   *a client server capable of coupling to said download server to access said remediation signatures;*
   *a deployment module coupled to said client server capable of deploying said remediation signatures to a client computer coupled to said client server; wherein said deployment module constructs a remediation profile for each client computer, wherein said remediation profile comprises remediation signatures to resolve vulnerabilities on said client computer;*
   *wherein a remediation signature comprises an automated sequence of actions which may be taken with respect to a client computer to modify the client computer to address a corresponding vulnerability on the client computer;*
   *wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management;*
   *a scanner capable of scanning said client computer to identify vulnerabilities;*
   *a mapping module coupled to the client server capable of mapping said identified vulnerabilities to remediation signatures;*
   *wherein said remediation profile comprises at least one identified vulnerability on the client computer and selectively included remediation signatures mapped to the identified vulnerabilities;*
   wherein the scanner is an independent scanner; *and* [further comprising:]
   an import module coupled to the client server capable of importing the identified vulnerabilities for the client computer.

6. A system for resolving computer vulnerabilities, comprising:
   a remediation server capable of coupling to a security intelligence agent having information about computer vulnerabilities in order to aggregate said vulnerability information into a remediation database;
   a signature module coupled to said remediation server to construct a remediation signature for each vulnerability;
   a download server coupled to said signature module to provide remote access to said remediation signatures;
   a client server capable of coupling to said download server to access said remediation signatures;
   a deployment module coupled to said client server capable of deploying said remediation signatures to a client computer coupled to said client server; wherein said deployment module *independently* constructs a remediation profile for each client computer, wherein said remediation signatures can be selectively included in said remediation profile;
   wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

10. [The system of claim 9.] *A system for resolving computer vulnerabilities, comprising:*

*a remediation server capable of coupling to a security intelligence agent having information about computer vulnerabilities in order to aggregate said vulnerability information into a remediation database;*

*a signature module coupled to said remediation server to construct a remediation signature for each vulnerability;*

*a download server coupled to said signature module to provide remote access to said remediation signatures;*

*a client server capable of coupling to said download server to access said remediation signatures;*

*a deployment module coupled to said client server capable of deploying said remediation signatures to a client computer coupled to said client server; wherein said deployment module constructs a remediation profile for each client computer, wherein said remediation signatures can be selectively included in said remediation profile;*

*wherein a remediation signature comprises an automated sequence of actions which may be taken with respect to a client computer to modify the client computer to address a corresponding vulnerability on the client computer;*

*wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management;*

*wherein said remediation profile comprises remediation signatures to resolve vulnerabilities on said client computer;*

*a scanner capable of scanning said client computer to identify vulnerabilities;*

*a mapping module coupled to the client server capable of mapping said identified vulnerabilities to remediation signatures;*

*wherein said remediation profile comprises at least one identified vulnerability on the client computer and selectively included remediation signatures mapped to the identified vulnerabilities;*

*wherein the scanner is an independent scanner;* and [further comprising:]

an import module coupled to the client server capable of importing the identified vulnerabilities for the client computer.

26. A method for resolving vulnerabilities in a plurality of computers in a network, comprising:

aggregating vulnerability information on a plurality of computer vulnerabilites;

constructing a remediation database of the plurality of computer vulnerabilities;

constructing at least one remediation signature to address a computer vulnerability;

using a scanner to scan at least a portion of the plurality of client computers in the network;

recording vulnerabilities identified by the scanner *for each computer* on the scanned portion of the plurality of client computers in the network;

mapping the identified vulnerabilities *for each computer* to corresponding remediation signatures;

managing vulnerability resolution by selectively resolving at least one identified vulnerability on at least a selected portion of the scanned portion of the plurality of client computers by deploying at least one remediation signature to the selected portion of the scanned portion of the plurality of client computers and using the deployed signature to remediate the identified vulnerability on the selected portion of the scanned portion of the plurality of client computers;

wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

30. [The method of claim 26] *A method for resolving vulnerabilities in a plurality of computers in a network, comprising:*

*aggregating vulnerability information on a plurality of computer vulnerabilites;*

*constructing a remediation database of the plurality of computer vulnerabilities;*

*constructing at least one remediation signature to address a computer vulnerability;*

*using a scanner to scan at least a portion of the plurality of client computers in the network;*

*recording vulnerabilities identified by the scanner on the scanned portion of the plurality of client computers in the network;*

*mapping the identified vulnerabilities to corresponding remediation signatures;*

*managing vulnerability resolution by selectively resolving at least one identified vulnerability on at least a selected portion of the scanned portion of the plurality of client computers by deploying at least one remediation signature to the selected portion of the scanned portion of the plurality of client computers and using the deployed signature to remediate the identified vulnerability on the selected portion of the scanned portion of the plurality of client computers;* wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management;

wherein the scanner is an independent scanner and wherein recording vulnerabilities comprises importing vulnerabilites from the independent scanner.

31. A system for resolving computer vulnerabilities comprising:

a remediation server capable of coupling to a security intelligence agent having information about computer vulnerabilities in order to aggregate said vulnerability information into a remediation database;

a signature module coupled to said remediation server to construct a remediation signatures, each remediation signature corresponding to a vulnerability;

a client server capable of receiving said remediation signatures;

a deployment module coupled to said client server capable of deploying said remediation signatures to a client computer coupled to said client server; wherein said deployment module *independently* constructs [a] remediation profiles, each *of said* remediation [profile] *profiles* corresponding to a client computer, wherein said remediation profiles comprise remediation signatures to resolve vulnerabilities on said corresponding client computers;

wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

32. A system for resolving computer vulnerabilities comprising:

a remediation server capable of coupling to a security intelligence agent having information about computer vulnerabilities in order to aggregate said vulnerability information into a remediation database;

a signature module coupled to said remediation server to construct a remediation signatures, each remediation signature corresponding to a vulnerability;

a client server capable of receiving said remediation signatures;

a deployment module coupled to said client server capable of deploying said remediation signatures to a client computer coupled to said client server; wherein said deployment module *independently* constructs [a] remediation profiles, each *of said* remediation [profile] *profiles* corresponding to a client computer, wherein said remediation signatures can be selectively included in said remediation profiles;

wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

35. [The system of claim 34.] *A system for resolving computer vulnerabilities, comprising:*

*a remediation server capable of coupling to a security intelligence agent having information about computer vulnerabilities in order to aggregate said vulnerability information into a remediation database;*

*a signature module coupled to said remediation server to construct a remediation signatures, each remediation signature corresponding to a vulnerability;*

*a client server capable of receiving said remediation signatures;*

*a deployment module coupled to said client server capable of deploying said remediation signatures to a client computer coupled to said client server; wherein said deployment module constructs a remediation profiles, each remediation profile corresponding to a client computer, wherein said remediation signatures can be selectively included in said remediation profiles;*

*wherein a remediation signature comprises an automated sequence of actions which may be taken with respect to a client computer to modify the client computer to address a corresponding vulnerability on the client computer;*

*wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management;*

*wherein said remediation profiles comprise remediation signatures to resolve vulnerabilities on said corresponding client computers;*

*a scanner capable of scanning said client computer to identify vulnerabilities;*

*a mapping module coupled to the client server capable of mapping said identified vulnerabilities to remediation signatures;*

*wherein said remediation profile comprises at least one identified vulnerability on the client computer and selectively included remediation signatures mapped to the identified vulnerabilities;* wherein the scanner is an independent scanner; and [further comprising:]
    an import module coupled to the client server capable of importing the identified vulnerabilities for the client computer.

38. A system for resolving computer vulnerabilities in a plurality of computers on a network comprising:

a remediation server capable of coupling to a security intelligence agent having information about computer vulnerabilities in order to aggregate said vulnerability information into a remediation database;

a signature module coupled to said remediation server to construct a remediation signatures, each remediation signature corresponding to a vulnerability;

a client server capable of receiving said remediation signatures;

a deployment module coupled to said client server capable of deploying said remediation signatures to a selection of client computers coupled to said client server; wherein said deployment module *independently* constructs remediation profiles, each *of said* remediation [profile] *profiles* corresponding to a client computer, wherein said remediation profiles comprise selectively included remediation signatures to resolve vulnerabilities on said corresponding client computers;

wherein a remediation signature comprises an automated sequence of actions which may be taken with respect to a client computer to modify the client computer to address a corresponding vulnerability on the client computer;

wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management.

41. [The system of claim 40.] *A system for resolving computer vulnerabilities in a plurality of computers on a network comprising:*

*a remediation server capable of coupling to a security intelligence agent having information about computer vulnerabilities in order to aggregate said vulnerability information into a remediation database;*

*a signature module coupled to said remediation server to construct a remediation signatures, each remediation signature corresponding to a vulnerability;*

*a client server capable of receiving said remediation signatures;*

*a deployment module coupled to said client server capable of deploying said remediation signatures to a selection of client computers coupled to said client server; wherein said deployment module constructs remediation profiles, each remediation profile corresponding to a client computer, wherein said remediation profiles comprise selectively included remediation signatures to resolve vulnerabilities on said corresponding client computers;*

*wherein a remediation signature comprises an automated sequence of actions which may be taken with respect to a client computer to modify the client computer to address a corresponding vulnerability on the client computer;*

*wherein there are a plurality of remediation signatures and wherein the plurality of remediation signatures comprise at least one remediation signature of the registry management type, at least one remediation signature of the patch installation type, and at least one remediation signature of at least one of the following additional remediation types: service management, security permissions management, account management, policy management, audit management, file management, and process management;*

*a scanner capable of scanning a portion of the plurality of client computers on the network to identify vulnerabilities on each of the scanned client computers;*

*a mapping module coupled to the client server capable of mapping said identified vulnerabilities to remediation signatures;*

*wherein said remediation profile comprises at least one identified vulnerability on the client computer and selectively included remediation signatures mapped to the identified vulnerabilities;* wherein the scanner is an independent scanner; and [further comprising:]

an import module coupled to the client server capable of importing the identified vulnerabilities for the client computers.

\* \* \* \* \*